United States Patent
Ginzboorg et al.

(10) Patent No.: US 11,223,954 B2
(45) Date of Patent: Jan. 11, 2022

(54) NETWORK AUTHENTICATION METHOD, DEVICE, AND SYSTEM

(71) Applicant: HUAWEI TECHNOLOGIES CO., LTD., Guangdong (CN)

(72) Inventors: Philip Ginzboorg, Helsinki (FI); Valtteri Niemi, Helsingin Yliopisto (FI); Bo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 15 days.

(21) Appl. No.: 16/598,981

(22) Filed: Oct. 10, 2019

(65) Prior Publication Data

US 2020/0045553 A1 Feb. 6, 2020

Related U.S. Application Data

(63) Continuation of application No. PCT/CN2017/080099, filed on Apr. 11, 2017.

(51) Int. Cl.
*H04W 12/122* (2021.01)
*H04L 9/32* (2006.01)
(Continued)

(52) U.S. Cl.
CPC ......... *H04W 12/122* (2021.01); *H04L 9/3236* (2013.01); *H04L 9/3252* (2013.01);
(Continued)

(58) Field of Classification Search
CPC . H04W 12/06; H04W 12/069; H04W 12/122; H04W 12/40; H04W 12/08;
(Continued)

(56) References Cited

U.S. PATENT DOCUMENTS 7,613,299 B2 * 11/2009 Carroll ...................... H04L 9/08
380/248
8,245,039 B2 * 8/2012 Jones .................... H04L 9/0844
713/168
(Continued)

FOREIGN PATENT DOCUMENTS

CN 1659820 A 8/2005
CN 101053273 A 10/2007
(Continued)

OTHER PUBLICATIONS

Young-Gab Kim, Chang-Joo Moon, Dae-Ha Park and Doo-Kwon Baik, "A service bundle authentication mechanism in the OSGi service platform," 18th International Conference on Advanced Information Networking and Applications, 2004. AINA 2004., 2004, pp. 420-425 vol. 1. (Year: 2004).*

(Continued)

*Primary Examiner* — Kari L Schmidt

(74) *Attorney, Agent, or Firm* — Leydig, Voit & Mayer, Ltd.

(57) ABSTRACT

A network authentication system comprises user equipment (UE), a service network (SN) and a home network (HN). The HN generates an expected user response (XRES) based on an identifier of the UE and generate an indicator, and sends the part of XRES and the indicator to the SN. The SN receives the part of XRES and indicator, and receives a user response (RES) from the UE. The SN then compares the RES with the XRES base on the indicator, and sends a confirmation message to the HN when the comparison succeeds.

9 Claims, 6 Drawing Sheets

(51) Int. Cl.
*H04L 29/06* (2006.01)
*H04W 12/06* (2021.01)
*H04W 12/40* (2021.01)

(52) U.S. Cl.
CPC ........ *H04L 9/3271* (2013.01); *H04L 63/1441* (2013.01); *H04W 12/06* (2013.01); *H04W 12/40* (2021.01); *H04L 2209/04* (2013.01)

(58) Field of Classification Search
CPC ... H04L 9/3271; H04L 9/3236; H04L 9/3252; H04L 63/1441
See application file for complete search history.

(56) References Cited

U.S. PATENT DOCUMENTS

| | | | | |
|---|---|---|---|---|
| 9,866,554 | B2* | 1/2018 | Choi | H04L 9/0861 |
| 10,382,206 | B2* | 8/2019 | Muhanna | H04L 9/3247 |
| 2003/0233546 | A1 | 12/2003 | Blom | |
| 2006/0079205 | A1 | 4/2006 | Semple et al. | |
| 2006/0253703 | A1* | 11/2006 | Eronen | H04L 63/0823 713/156 |
| 2007/0192602 | A1 | 8/2007 | Blom et al. | |
| 2007/0234404 | A1 | 10/2007 | Bogdanovic et al. | |
| 2009/0061820 | A1 | 3/2009 | Patel et al. | |
| 2009/0089583 | A1* | 4/2009 | Patel | H04L 9/3273 713/171 |
| 2009/0305671 | A1* | 12/2009 | Luft | H04W 12/08 455/411 |
| 2010/0011220 | A1 | 1/2010 | Zhao | |
| 2011/0167270 | A1 | 7/2011 | Lee et al. | |
| 2011/0167272 | A1 | 7/2011 | Kolesnikov | |
| 2011/0269423 | A1 | 11/2011 | Schell et al. | |
| 2011/0312301 | A1* | 12/2011 | Muller | H04L 9/083 455/411 |
| 2012/0142315 | A1* | 6/2012 | Chung | H04L 63/0869 455/411 |
| 2014/0153722 | A1* | 6/2014 | Mizikovsky | H04W 12/12 380/270 |
| 2014/0156998 | A1 | 6/2014 | Lambert | |
| 2015/0139424 | A1 | 5/2015 | Campagna et al. | |
| 2016/0255064 | A1* | 9/2016 | Naslund | G06F 21/602 726/3 |
| 2016/0277191 | A1* | 9/2016 | Lee | H04W 4/20 |
| 2016/0318428 | A1 | 11/2016 | Hugues | |
| 2016/0323275 | A1* | 11/2016 | Choi | H04L 63/0869 |
| 2017/0264439 | A1* | 9/2017 | Muhanna | H04W 12/06 |
| 2018/0013568 | A1* | 1/2018 | Muhanna | H04L 63/045 |
| 2019/0182654 | A1* | 6/2019 | Jerichow | H04W 8/183 |
| 2019/0246272 | A1* | 8/2019 | Richard | H04L 9/3242 |

FOREIGN PATENT DOCUMENTS

| | | |
|---|---|---|
| CN | 101197673 A | 6/2008 |
| CN | 101785277 A | 7/2010 |
| CN | 101931955 A | 12/2010 |
| CN | 102137397 A | 7/2011 |
| CN | 102783080 A | 11/2012 |
| CN | 102859966 A | 1/2013 |
| CN | 103856288 B | 6/2014 |
| CN | 104604181 A | 5/2015 |
| CN | 104735037 A | 6/2015 |
| CN | 102905265 B | 2/2016 |
| CN | 106790053 A | 5/2017 |
| EP | 1414212 A1 | 4/2004 |
| GB | 2403880 A | 1/2005 |
| JP | H1153264 A | 2/1999 |
| JP | 2005529569 A | 9/2005 |
| JP | 2005530429 A | 10/2005 |
| JP | 2013529019 A | 7/2013 |
| KR | 20130073728 A | 7/2013 |
| RU | 2480925 C2 | 4/2013 |
| RU | 2574844 C2 | 2/2016 |
| WO | 200182267 A1 | 11/2001 |
| WO | 03107584 A1 | 12/2003 |
| WO | 2015091348 A1 | 6/2015 |

OTHER PUBLICATIONS

Khan, Mohammed Shafiul Alam, and Chris J. Mitchell. "Trashing IMSI catchers in mobile networks." Proceedings of the 10th ACM Conference on Security and Privacy in Wireless and Mobile Networks. 2017, pp. 207-218. (Year: 2017).*
KPN,"Solution for LI in Privacy Enhanced Attach solutions",3GPP TSG SA WG3 (Security) Meeting #86Bis S3-170672,Mar. 27-31, 2017, Busan, Korea,total 2 pages.
Takemori et al.,"Protection for Automotive Control System Using Secure Boot and Authentication," Technical Report of IEICE, vol. 114, No. 225. Institute of Electronics, Information and Communication Engineers, Japan (Sep. 2014). with English Abstract.
Guang Gong et al.,"Security Assessment of TUAK Algorithm Set",Oct. 30, 2014,total 116 pages.
Na Li et al.,"Amendment and Analysis of EAP-AKA Protocol",Computer Security,dated Jun. 2010,total 3 pages with 4 pages English translation.
S3-170927 Huawei, Hisilicon,"Comments on Proposed interim agreement on support for AKA variants for 5G", 3GPP TSG SA WG3 (Security) Meeting #86Bis, Mar. 27-31, 2017, Busan, Korea,total 3 pages.
TR 33.899 SP-170096 TR_33899_cover_sheet,SA3,"Presentation of Specification/Report to TSG:TR 33.899, Version 1.0.0",3GPP TSG-SA Meeting #75, Dubrovnik, Croatia, Mar. 8-10, 2017,total 2 pages.
3GPP TR 33.899 V1.0.0 (Mar. 2017),3rd Generation Partnership Project;Technical Specification Group Services and System Aspects;Study on the security aspects of the next generation system(Release 14),total 471 pages.
3GPP TS 33.102 V14.1.0 (Mar. 2017), 3rd Generation Partnership Project;Technical Specification Group Services and System Aspects;3G Security;Security architecture(Release 14) ,total 77 pages.
S3-161989 Nokia,"EPS AKA enhanced with UE authentication confirmation",3GPP TSG SA WG3 (Security) Meeting #85,Nov. 7-11, 2016 Santa Cruz de Tenerife (Spain),total 3 pages.
S3-161990 Nokia,"Introducing EPS AKA* to authentication framework in solution 2.7",3GPP TSG SA WG3 (Security) Meeting #85,Nov. 7-11, 2016, Santa Cruz de Tenerife (Spain),total 7 pages.
S3-170303 Ericsson,"Update to solution #2.9: New variant solution EAP-AKA*",3GPP TSG-SA WG3 Meeting #86 , Sophia Antipolis, France, Feb. 6-10, 2017,total 10 pages.
S3-170440 Nokia,"pCR on evaluation of EPS AKA*",3GPP TSG SA WG3 (Security) Meeting #86,Feb. 6-10, 2017, Sophia Antipolis (France),total 3 pages.
S3-170947 Nokia,"Proposed interim agreement on support for AKA variants for 5G phase 1",3GPP TSG SA WG3 (Security) Meeting #86Bis,Mar. 27-31, 2017, Busan, Korea,total 2 pages.

* cited by examiner

Selected bits of XRES

NETWORK AUTHENTICATION METHOD, DEVICE, AND SYSTEM

CROSS-REFERENCE TO RELATED APPLICATIONS

This application is a continuation of International Application No. PCT/CN2017/080099, filed on Apr. 11, 2017, which is hereby incorporated by reference in its entirety.

TECHNICAL FIELD

The present invention relates to the communications field, and in particular, to a security countermeasures for attack on EPS AKA*.

BACKGROUND

In a scene of Long Term Evolution (LTE), a SN (service network) rejects Attach Request from a User Equipment (UE), and then sends Update Location message for the International Mobile Subscriber Identity (IMSI) in that UE to the home network (HN). Afterwards, the visited SN sends to the HN a charging record for subscriber having that IMSI, even though it did not provide any service to the roaming subscriber.

To mitigate this type of fraud, 3GPP SA3 plans to adopt a new variant of authentication and key agreement (AKA) procedure, described in TR 33.899 [1], solution #2.22 "EPS AKA with UE authentication confirmation." This solution is called EPS AKA* (Evolved Packet System AKA*).

Please refers to FIG. 1. The FIG. 1 describes an EPS AKA* procedure. Wherein the RAND is network challenge random number, AUTN is a network Authentication Token, AV is authentication vector, which consists of 4 elements: a) a network challenge RAND, b) an expected user response XRES, c) a key (e.g. Kasme, or two keys CK and IK) and d) a network authentication token AUTN. An expected response XRES=f2K (RAND), where f2 is a (possibly truncated) message authentication function and the root key K that could be determined by the identifier of UE (e.g. IMSI), denotes the shared key between UE and HN. RES is user response, which is generated using the function f2K (RAND) by UE, and wherein The RES size can be between 32 bit and 64 bit, we will assume that the size of RES is an even number and denote it by 2n. (The MILENAGE function f2 can support RES lengths from 32 to 64 bit. TUAK function f2 can support RES of 32, 64, 128 or 256 bits, the latter only if the size of master key K is 256 bit.).

In EPS AKA* procedure the HN includes only half of expected user response (XRES) in the authentication vector that it sends to the SN in Authentication Information Answer message. The SN compares half of the user response (RES) that it has received on the radio interface from UE in response to the random challenge RAND, with the part of the XRES that it has earlier received from HN. If the two parts match, then SN considers EPS AKA* procedure run successful; and it forwards the (whole) response RES to the HN in Authentication Confirmation message. The HN then compares the RES received from SN with the (whole) expected response XRES. If they do not match then the SN is suspected of fraud.

Let us assume, first, that the authentication vector (AV*) of EPS AKA*, received by the visited SN from HN, includes only the lower part (the n less significant bits) of XRES. Second, let us assume that an attacker's UE contains a valid, untampered Universal Subscriber Identity Module (USIM), but the Mobile Equipment (ME) part of the UE has been modified by the attacker.

Attacker's ME takes the (correct) 2n bit RES from the USIM, modifies some bits in the upper part (the n most significant digits) of RES and sends this modified RES to the SN in Authentication Reply message on the radio interface. Since the lower part of XRES received by SN matches the lower part of RES, this modification will go unnoticed by the SN. The SN will consider the authentication successful; after establishing a security context with the UE, the SN will include the RES into Authentication Confirmation message and send that message to the HN. Note that the contents of RES parameter do not affect the security context.

The modification in RES is transparent to the SN and also to the subscriber, because his UE gets the normal service from SN. But when the HN receives the Authentication Confirmation message (that contains RES) it will notice a mismatch in the upper part of RES with the corresponding part of XRES. This makes the SN suspect of fraud in the eyes of HN. The HN may then generate another authentication vector AV* and request from the SN an additional authentication of the UE. During this additional authentication the attacker's ME may either (i) leave the RES intact, with the end result of extra work for the SN and HN (because they do two authentications instead of one); or, (ii) it may choose to modify RES again, making SN doubly suspicious in the eyes of HN. In the latter case, the HN may request a yet another (third) authentication, giving the attacker's ME again these two choices.

The mismatch in the upper part of RES can happen also due to corruption of correct RES during transmission over the radio interface. But, as noted in TR 33.899 [1] clause 5.2.4.22.3, this is a rare event.

SUMMARY

Embodiments of the present invention provide security countermeasures and systems for attack on EPS AKA*. These countermeasures include one method for mitigating the attack, and then follow with two other methods that could be used instead.

A first aspect of the embodiments of the present invention discloses a network authentication system, wherein the system comprises a user equipment (UE), a service network (SN) and a home network (HN);

The HN is configured to generate an expected user response (XRES) based on an identifier of the UE and generate an indicator; the identifier is from the SN or from the UE, and the identifier may be an International Mobile Subscriber Identity (IMSI);

The HN is configured to send the part of XRES and the indicator to the SN;

The SN is configured to receive the part of XRES and indicator;

The SN is configured to receive a user response (RES) from the UE;

The SN is configured to compare the RES with the XRES base on the indicator;

The SN is configured to send a confirmation message to the HN when the comparison succeeds.

With reference to the first aspect, in a first possible manner, wherein the indicator is a random value R; wherein the step of sending the part of XRES and the indicator to the SN comprises:

Sending the lower part of XRES and the R to the SN when the R is equal to the zero;

Wherein the step of comparing the RES with the XRES base on the indicator comprise:

Determining the lower part of the RES when the R is equal to zero; and comparing the lower part of the RES with the received XRES.

With reference to the first aspect, in a second possible manner, wherein the indicator is a random value R; wherein the step of sending the part of XRES and the indicator to the SN comprises:

Sending the upper part of XRES and the R to the SN when the R is equal to the one;

Wherein the step of comparing the RES with the XRES base on the indicator comprise:

Determining the upper part of the RES when the R is equal to one; and comparing the upper part of the RES with the received XRES.

With reference to the first aspect, in a third possible manner, wherein the indicator is a random value R; wherein the step of sending the part of XRES and the indicator to the SN comprises:

Sending the lower part of XRES and the R to the SN when the R is equal to the one;

Wherein the step of comparing the RES with the XRES base on the indicator comprise:

Determining the lower part of the RES when the R is equal to one; and comparing the lower part of the RES with the received XRES.

With reference to the first aspect, in a fourth possible manner, wherein the indicator is a random value R; wherein the step of sending the part of XRES and the indicator to the SN comprises:

Sending the upper part of XRES and the R to the SN when the R is equal to the zero;

Wherein the step of comparing the RES with the XRES base on the indicator comprise:

Determining the upper part of the RES when the R is equal to zero; and comparing the upper part of the RES with the received XRES.

With reference to the first aspect, in a fifth possible manner, wherein the indicator is a mask of 2n bits (the size of XRES); wherein the step of sending the XRES and the indicator to the SN comprises:

Sending the selected XRES and the mask of 2n bits to the SN; where the selected XRES includes the bits corresponding to the part of the XRES that the SN needs check against RES are set to one in R;

Wherein the step of comparing the RES with the XRES base on the indicator comprise:

Determining target location of the RES based on the mask of 2n bits; specially, by selecting the bits corresponding to the part of the RES that the SN needs check against RES are set to one in mask of 2n bits;

Comparing the selected XRES with target location of RES.

A second aspect of the embodiments of the present invention discloses a network authentication system, wherein the system comprises a user equipment (UE), a service network (SN) and a home network (HN);

The HN is configured to generate an expected user response (XRES) based on an identifier of the UE and generate a mask of 2n bits (the size of XRES);

The HN is configured to send the XRES and the a mask of 2n bits to the SN;

The SN is configured to receive the XRES and a mask of 2n bits;

The SN is configured to receive a user response (RES) from the UE;

The SN is configured to determine target location of the XRES based on the mask of 2n bits, by selecting the bits corresponding to the part of the XRES that the SN needs check against RES are set to one in the mask of 2n bits; and comparing the target location of XRES with the corresponding location of the RES;

The SN is configured to send a confirmation message to the HN when the comparison succeeds. Specially, the step of comparison succeeds comprises: the target location of XRES is equal to corresponding location of the RES.

A third aspect of the embodiments of the present invention discloses a network authentication system, wherein the system comprises a user equipment (UE), a service network (SN) and a home network (HN);

The SN is configured to receive a request from the UE, wherein the request include an International Mobile Subscriber Identity (IMSI);

The SN is configured to send the IMSI to the HN;

The HN is configured to generate an expected user response (XRES) based on the IMSI; and compute a message authentication code (MAC) value for XRES by a key K;

The HN is configured to send the MAC and the K to the SN;

The SN is configured to receive the XRES and K;

The SN is configured to receive a user response (RES) from the UE;

The SN is configured to compute MAC1 based on the K and RES;

The SN is configured to compare the MAC with the MAC1 to determine whether the MAC and the MAC1 are equal;

The SN is configured to send a confirmation message to the HN when the MAC and the MAC1 are equal.

With reference to the third aspect, in a first possible manner, wherein the K is a one-time key between HN and SN; or the K is a shared key between HN and SN; or the K is derived from shared key(s) between HN and SN; or the K is negotiated between HN and SN based on public key or certificates.

With reference to the third aspect, in a second possible manner, wherein confirmation message include the RES;

The HN is configured to compare the RES with the XRES to determine whether the RES is equal to the XRES.

A fourth aspect of the embodiments of the present invention discloses a network authentication system, wherein the system comprises a user equipment (UE), a service network (SN) and a home network (HN);

The SN is configured to receive a request from the UE, wherein the request include an International Mobile Subscriber Identity (IMSI);

The SN is configured to send the IMSI to the HN;

The HN is configured to generate an expected user response (XRES) based on the IMSI; and compute a digital signature value X based on the XRES and a private key (SK);

The HN is configured to send the X to the SN;

The SN is configured to receive a user response (RES) from the UE;

The SN is configured to verify the digital signature X based on public key (PK) and RES; and the PK is pre-stored or received from the HN.

The SN is configured to send a confirmation message to the HN when the X is successfully verified.

A fourth aspect of the embodiments of the present invention discloses the structure of the UE, SN and HN referred in the foregoing aspects. Wherein the UE comprises processor, memory, network interface, bus, transceiver. The memory comprises a non-transitory media which could be readable by the processor, the non-transitory media storing instructions that when executed by the processor, cause the processor to execute the method described in the foregoing aspects. Wherein the SN comprises processor, memory, network interface, bus, transceiver. The memory comprises a non-transitory media which could be readable by the processor, the non-transitory media storing instructions that when executed by the processor, cause the processor to execute the method described in the foregoing aspects. Wherein the HN comprises processor, memory, network interface, bus, transceiver. The memory comprises a non-transitory media which could be readable by the processor, the non-transitory media storing instructions that when executed by the processor, cause the processor to execute the method described in the foregoing aspects.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

We will describe methods for mitigating the attack.

Method 1

The attacker's UE (user equipment) changes the part of RES which SN (service network) cannot check against XRES (expected user response). To do that, the attacker's UE has to know what part of XRES the SN has received from HN (home network). Thus, in order to mitigate the attack, the UE should be unaware which part of XRES is known to the SN. It is clear that a static setting of this part can be eventually discovered by an attacker; the setting should be dynamic and hard to predict. This implies that HN shall choose at random the part of XRES that it sends to SN.

We give an example of how this can be implemented. Before sending the AV* to the SN, the HN generates a random number r that is either zero or one. If r=0, then the HN includes the lower part of XRES in the AV*; otherwise, the HN includes the upper part of XRES in the AV*. The HN must also somehow indicate to the SN which part of the XRES shall be used to check the RES. For instance, the HN could include in the AV* the value of r; or, instead of the value of r, it could include a mask of 2n bits (the size of XRES), where the bits corresponding to the part of the XRES that the SN needs check against RES are set to one, and all other bits are set to zero. In any event, the HN should include in Authentication Information Reply message a field which indicates to the SN which part of XRES the SN should check against RES, and/or which part it should not.

With this countermeasure in place the attacker's ME can only guess which part of RES it needs to modify. Observe that a wrong guess of the attacker may be noticed by the subscriber, because his UE will not receive service from the SN. (Still, if the attacker's ME guesses wrongly, it can immediately initiate another EPS AKA* procedure run—and reply with the correct RES this time.) Observe also, that is enough for the attacker to modify just one bit in the part of RES that is not known to the visited SN, in order to make that SN suspect of billing fraud.

How to include mask in selection corresponding part of XRES:

Using XRES and mask as input parameters of a selection function, and the output of the selection function could be the selected bits of XRES.

Figure 1:
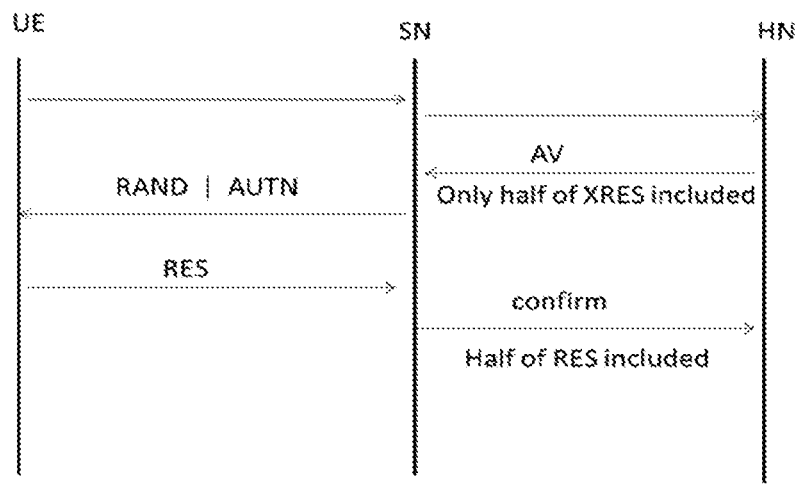
FIG. 1 is a flowchart of an EPS AKA* procedure.
Figure 2:
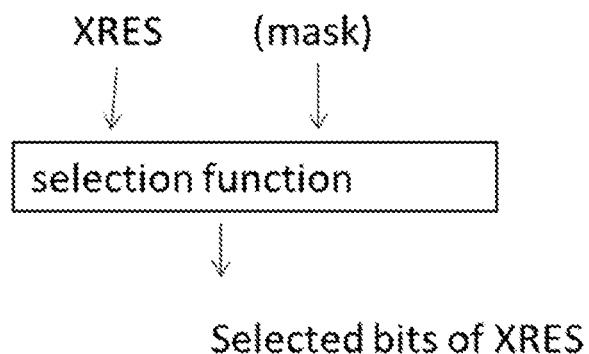
FIG. 2 is a diagram of generating selected bits of XRES according to an embodiment of the present invention.

Based on the communication progress of FIG. 1, as shown in FIG. 2, FIG. 2 is a diagram of generating selected bits of XRES according to an embodiment of the present invention.

One possible example of mask:

Using XRES and mask as input parameters of a selection function, and the output of the selection function could be the selected bits of XRES. In the mask the bits corresponding to the part of the XRES that the SN needs check against RES are set to one, and all other bits are set to zero, and output would be the selected bits of XRES, where the bit with value of 1 in the mask would be the bit selected in XRES. The other option is that the bit with value of 0 in the mask would be the bit selected in XRES.

Figure 3:
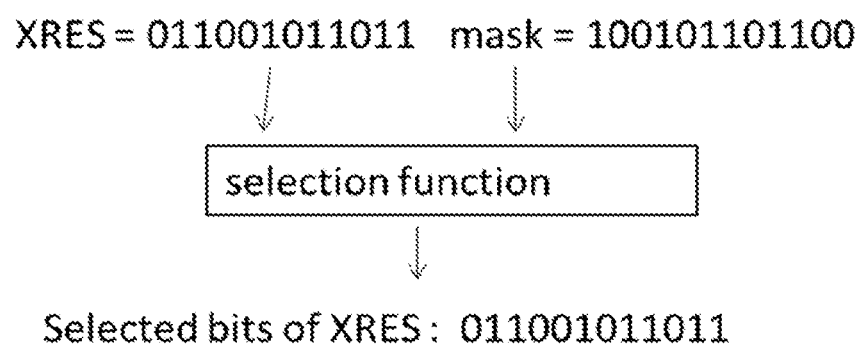
FIG. 3 is a diagram of generating selected bits of XRES according to an embodiment of the present invention.

Based on the communication progress of FIG. 1, as shown in FIG. 3, FIG. 3 is a diagram of generating selected bits of XRES according to an embodiment of the present invention.

Let us denote by m the number of bits in the part of RES that is not checked by the SN against the corresponding part of XRES. If the attacker's ME flips one, randomly chosen bit of RES before sending the modified RES to the SN, then the probability p that the the bit chosen by the attacker will be one of those m bits is $m/(2n)$. For example, EPS AKA*, as described in TR 33.899 [1] sets m=n; with that setting the probability p is one half.

Since making m smaller reduces p, the best setting (for reducing p) is m=1. With that setting the probability p (the attacker's probability to pass the SN check) reduces to $1/(2n)$: for example, when the size of RES, 2n=32, the probability p is $1/32$, or about 3 percent; when 2n=64, the probability p is about 1.5 percent; and when 2n=128, the probability p is about 0.8 percent.

With the setting of m=1, the indicator field in Authentication Information Reply message from HN to SN could be an integer which points to the position of the (single) bit in XRES that the SN should not check against RES.

Remember, however, that the attacker may be SN, rather than the UE. In the above mitigation method (Method 1), the probability that the attacker SN succeeds in guessing that part of XRES that it does not know is 1−p: as we decrease the chances of attacker UE (by decreasing p), we increase the chances of attacker SN, and vice versa. In addition, p of one to three percent is rather large. We will next describe a more effective way to protect against both attacker UE and against attacker SN. It achieves that both p and 1−p equal to $\frac{1}{2}^n$. For example, if the size of RES 2n=32, then p=$\frac{1}{2}^{16}$, that is in the order of one thousandth of a percentage point.

Method 2

In this scheme the HN does not send any parts of XRES explicitly to SN but instead HN sends an n-bit check value X for checking the UE's response RES. The check value X is derived from the 2n-bit XRES by a suitable hash-type function $f$ The HN also indicates to the SN what the function is.

For example, the value X could be a message authentication code (MAC) value computed for XRES by a one-time key that is sent by HN to SN together with X.

Another possibility is to encrypt XRES with a block cipher whose block length is 2n. The check value X would now be the lower part of the encrypted XRES. Again, the one-time key used for encryption is sent together with X.

When SN receives RES from the UE, it first applies the hash-type function $f$ to the received RES and checks whether the result matches X. For the additional check by the HN, the SN sends whole RES to HN in Authentication Confirmation message.

Figure 4:
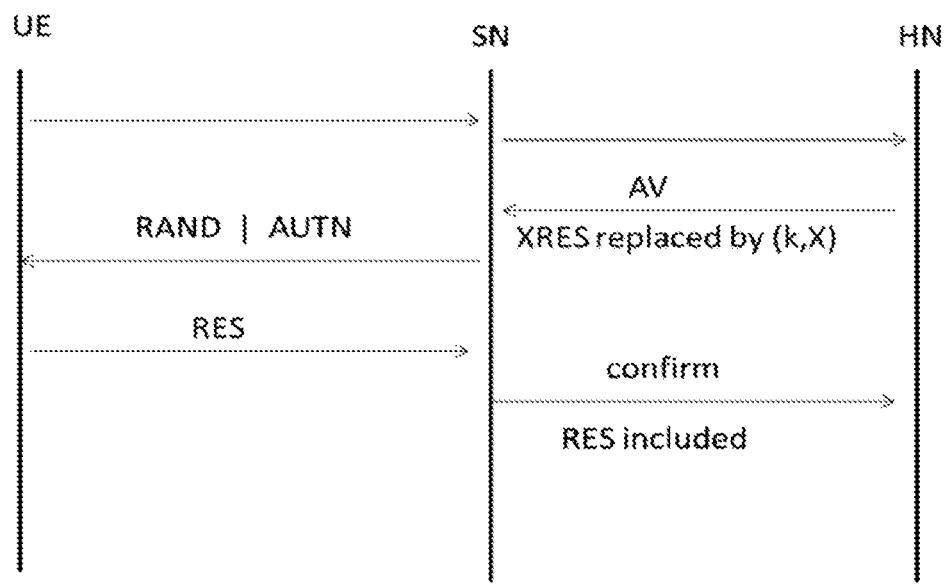
FIG. 4 is a diagram of authentication process according to an embodiment of the present invention.

As shown in FIG. 4, FIG. 4 is a diagram of authentication process according to an embodiment of the present invention.

Solutions to Calculate X:

Solution 1

Using K and XRES as inputs of a MAC function, and the output of the MAC function is X. the K could be a one time key. Another possibility is the K is a shared key between HN and SN. Another option is K is derived from shared key(s) between HN and SN. Still another option is K is negotiated between HN and SN based on public key or certificates.

Figure 5:
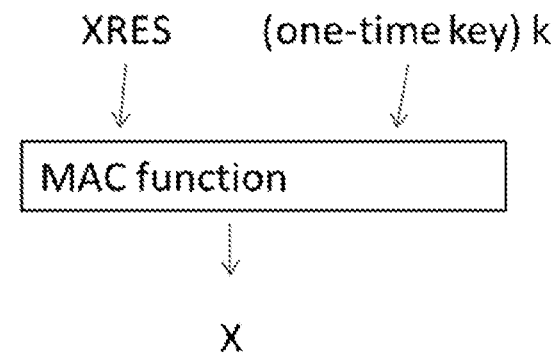
FIG. 5 is a diagram of generating MAC according to an embodiment of the present invention.

As shown in FIG. 5, FIG. 5 is a diagram of generating MAC according to an embodiment of the present invention.

Solution 2

Using K and XRES as inputs of an encryption function, and the output of the encryption function is X. the K could be a one time key. Another possibility is the K is a shared key between HN and SN. Another option is K is derived from shared key(s) between HN and SN. Another option is K is negotiated between HN and SN based on public key or certification.

Figure 6:
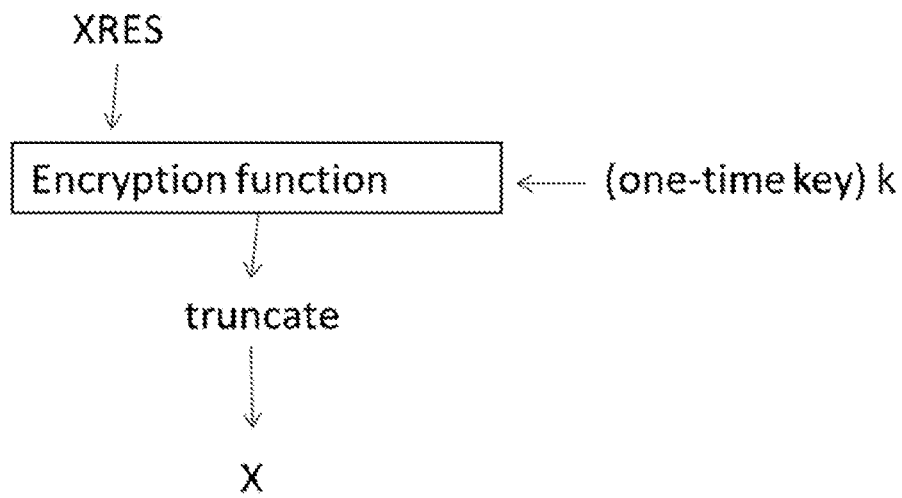
FIG. 6 is a diagram of encryption according to an embodiment of the present invention.

As shown in FIG. 6, FIG. 6 is a diagram of encryption according to an embodiment of the present invention.

Let us now calculate the chances of cheating for both UE and SN when Method 2 is used. The UE does not know the key with which the SN is going to apply the hash-type function. Therefore, UE has no way of knowing which other values of RES would lead to the same value of X. (Actually, UE does not even know the value X either but that is not relevant here.) Therefore, the best strategy for UE is to simply guess, and success probability is 1 out of $2^n$.

The SN knows the key and it knows the value X but without executing the authentication with the (valid) UE it does not know RES: With the key and the value X, it is possible (although cumbersome) for SN to compute (many) values of RES that would lead to X. But the cheating SN has no way to find out which of the many RES-values would be the correct one. Again, the success chance is (at least in average) 1 out of $2^n$.

Both of the probability values follow from the fact that (at least in average) each value X is obtained from n different RES-values when the hash-type function is applied with a fixed key.

Note that by changing the length of X, different trade-offs would be achieved between chances of cheating in the two cases: first case is a cheating UE, another one is a cheating SN.

Note also that the function to compute X does not need to be based on either encryption or hash-type function. To protect against cheating UE, it is sufficient that the choice of different functions is large enough to guarantee that the UE cannot find an alternative parameter RES' that could be sent instead of RES and still get accepted by SN with big enough probability. To protect against cheating SNs, it is sufficient that there are sufficiently many parameters RES' that could be received instead of RES and still get accepted by SN.

Method 3

In this scheme the HN does not send any parts of XRES explicitly to SN but instead HN sends an k-bit check value X for checking the UE's response RES. The check value X is derived from the 2n-bit XRES by a suitable digital signature function $f$. The HN also indicates to the SN what the function is.

For example, the value X could be a digital signature value computed for XRES by a private key (SK) that is managed by HN. And, HN sents public key (PK) and X to SN, where SK and PK are a pair of asymmetric cryptography keys.

When SN receives RES from the UE, it first applies the digital signature verification algorithm to the PK, X and received RES, and checks whether the X is correct. If the verification is correct, SN considers the authentication successful. If not the SEAF rejects the authentication. For the additional check by the HN, the SN sends whole RES to HN in Authentication Confirmation message.

Let us now calculate the chances of cheating for both UE and SN when Method 3 is used. The UE does not know the private key SK with which the HN is going to apply the signature function. Therefore, UE has no way of knowing which other values of RES would lead to the same value of X. (Actually, UE does not even know the value X either but that is not relevant here.) Therefore, the best strategy for UE is to simply guess the signature X, and success probability is related with digital signature security, which is much lower than 1 out of $2^n$.

The SN only knows the public key PK and it knows the value X but without executing the authentication with the (valid) UE it does not know RES: With the key PK and the value X, it is not possible (although cumbersome) for SN to compute a correct X for any RES. Therefore, the cheating SN has no way to find out which of the many RES-values would be the correct one. The success chance is (at least in average) 1 out of $2^n$.

Both of the probability values follow from the fact that (at least in average) each value X is obtained from n different RES-values when the digital signature function is applied with a fixed key.

The other option is that X is computed based on part of XRES (e.g., the upper part). Therefore, SN verifies the X based on this part of RES (e.g., the upper part) and PK. HN and SN may negotiate that which part will be used for verification. Or, HN may dynamically select the verification part, and notify the SN the verification part via a parameter (e.g., mask as described in method 1, or one bit r for upper and lower part clarification, etc).

The HN may generate the PK and SK by itself. On the other hand, the PK and SK may be preconfigured within the HN, or distributed to HN.

The above asymmetric cryptography keys PK and SK could be generated dynamically for every authentication procedure, or the fixed keys for the SN and HN pair.

The above asymmetric cryptography (i.e. digital signature function $f$) denotes the general signature algorithms, including but not limited to the Digital Signature Algorithm, Schnnor signature algorithm, identity-based signature algorithm, elliptic curve digital signature algorithm, etc.

Figure 7:
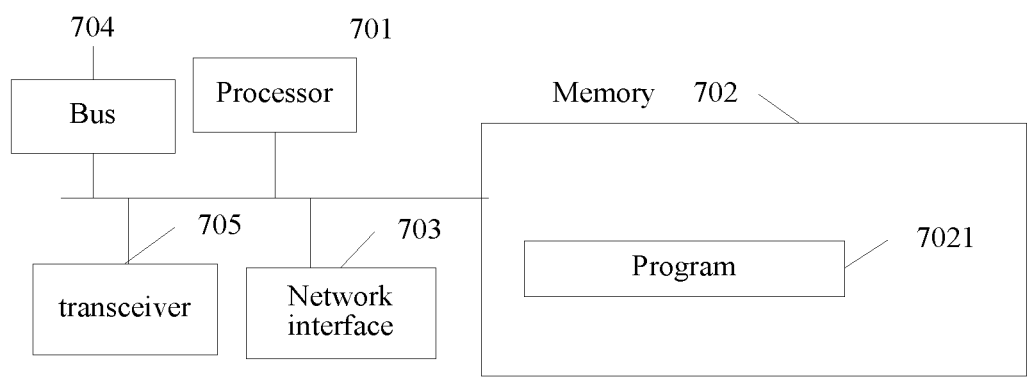
FIG. 7 is a structural diagram of the UE according to an embodiment of the present invention.

As shown in FIG. 7, FIG. 7 is a diagram of the UE according to an embodiment of the present invention. Wherein the UE comprises processor 701, memory 702, network interface 703, bus 704, transceiver 705.

Figure 8:
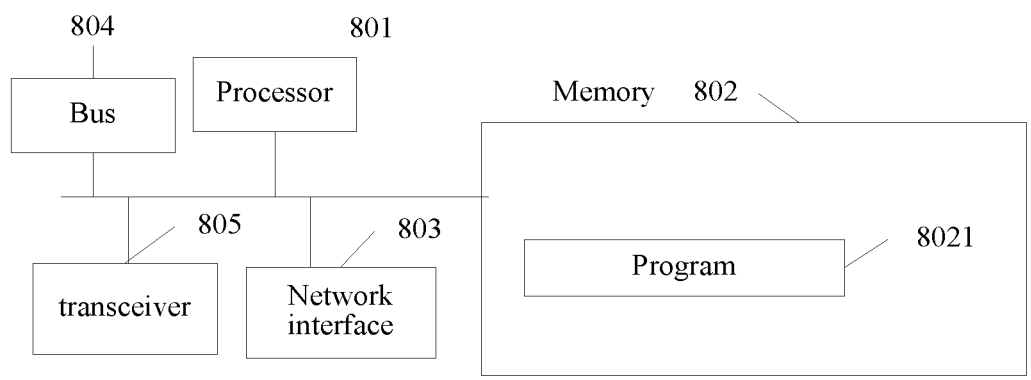
FIG. 8 is a structural diagram of the SN according to an embodiment of the present invention.

As shown in FIG. 8, FIG. 8 is a diagram of the SN according to an embodiment of the present invention. Wherein the SN comprises processor 801, memory 802, network interface 803, bus 804, transceiver 805.

Figure 9:
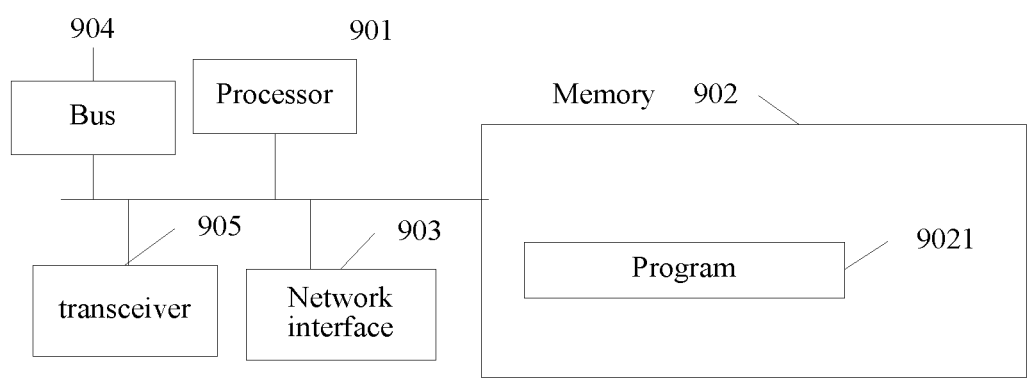
FIG. 9 is a structural diagram of the HN according to an embodiment of the present invention.

As shown in FIG. 9, FIG. 9 is a diagram of the HN according to an embodiment of the present invention. Wherein the HN comprises processor 901, memory 902, network interface 903, bus 904, transceiver 905.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously. In addition, a person skilled in the art should also understand that all the embodiments described in this specification belong to exemplary embodiments, and the involved actions and modules are not necessarily mandatory to the present invention.

Content such as information exchange and an execution process between the modules in the foregoing apparatus and system is based on a same idea as the method embodiments of the present invention. Therefore, for detailed content, refer to descriptions in the method embodiments of the present invention, and details are not described herein again.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may be a magnetic disk, an optical disc, a read-only memory (ROM: Read-Only Memory), a RAM, or the like.

Specific examples are used in this specification to describe the principle and implementation manners of the present invention. The descriptions of the foregoing embodiments are merely intended to help understand the method and idea of the present invention. In addition, with respect to the implementation manners and the application scope, modifications may be made by a person of ordinary skill in the art according to the idea of the present invention. Therefore, this specification shall not be construed as a limitation on the present invention.

What is claimed is:

1. A network authentication system, comprising:
a service network comprising at least one hardware processor; and
a home network comprising at least one hardware processor;
wherein the home network is configured to:
send a check value X to the service network, the check value X is derived from an expected user response (XRES) and a key (K) by a hash-type function, the check value X is a message authentication code (MAC) value, and the hash-type function is a MAC function; and
send an indication identifying the MAC function to the service network; and
wherein the service network is configured to:
receive the check value X;
receive a user response from user equipment;
apply the hash-type function to the user response to generate a hashed result; and
compare the hashed result with the check value X to determine whether the hashed result matches the check value X.

2. The network authentication system according to claim 1, wherein the service network is further configured to send the user response to the home network, and wherein the home network is further configured to check the user response.

3. The network authentication system according to claim 1, wherein the XRES is generated based on an international mobile subscriber identity (IMSI) of the user equipment.

4. A method for authentication, comprising:
receiving, by a service network, a check value X from a home network, wherein the check value X is derived from an expected user response (XRES) and a key (K) by a hash-type function, the check value X is a message authentication code (MAC) value, and the hash-type function is a MAC function;
receiving, by the service network from the home network, an indication identifying the MAC function;
receiving, by the service network, a user response from user equipment;
applying, by the service network, the hash-type function to the user response to generate a hashed result; and
comparing the hashed result with the check value X to determine whether the hashed result matches the check value X.

5. The method according to claim 4, further comprising:
sending, by the service network, the user response to the home network such that the user response is checked by the home network.

6. The method according to claim 4, wherein the XRES is generated based on an international mobile subscriber identity (IMSI) of the user equipment.

7. An apparatus for network authentication, comprising:
a processor; and
a memory storing executable instructions;
wherein the processor is configured to execute the executable instructions to:
receive a check value X from a home network, wherein the check value X is derived from an expected user response (XRES) and a key (K) by a hash-type function, the check value X is a message authentication code (MAC) value, and the hash-type function is a MAC function;
receive from the home network an indication identifying the MAC function;
receive a user response from user equipment;
apply the hash-type function to the user response to generate a hashed result; and compare the hashed result with the check value X to determine whether the hashed result matches the check value X.

8. The apparatus according to claim 7, wherein the processor is further configured to send the user response to the home network.

9. The apparatus according to claim 7, wherein the XRES is generated based on an international mobile subscriber identity (IMSI) of a user equipment.

\* \* \* \* \*

UNITED STATES PATENT AND TRADEMARK OFFICE
CERTIFICATE OF CORRECTION

| | |
|---|---|
| PATENT NO. | : 11,223,954 B2 |
| APPLICATION NO. | : 16/598981 |
| DATED | : January 11, 2022 |
| INVENTOR(S) | : Ginzboorg et al. |

It is certified that error appears in the above-identified patent and that said Letters Patent is hereby corrected as shown below:

On the Title Page

(71) Applicant: "HUAWEI TECHNOLOGIES CO., LTD., Guangdong (CN)" should read
-- HUAWEI TECHNOLOGIES CO., LTD., Shenzhen (CN) --.

Page 2: Item (56) Foreign Patent Documents, Citation No. 9: "CN 103856288 B 6/2014" should read
-- CN 103856288 B 6/2017 --.

Page 2: Item (56) Foreign Patent Documents, Citation No. 15: "GB 2403880 B 1/2005" should read
-- GB 2403880 B 11/2005 --.

Signed and Sealed this
Twenty-fourth Day of May, 2022

Katherine Kelly Vidal
*Director of the United States Patent and Trademark Office*